Oct. 27, 1942.  F. W. HOTTENROTH, JR  2,300,223
TRANSMISSION MECHANISM
Filed Oct. 4, 1941

Inventor:
Frederick W. Hottenroth, Jr.,
by  Harry E. Dunham
His Attorney.

Patented Oct. 27, 1942

2,300,223

UNITED STATES PATENT OFFICE 2,300,223

TRANSMISSION MECHANISM

Frederick W. Hottenroth, Jr., Schenectady, N. Y., assignor to General Electric Company, a corporation of New York Application October 4, 1941, Serial No. 413,623

2 Claims. (Cl. 192—45)

This invention relates to transmission mechanisms and more particularly to one-way clutches for use in such mechanisms.

It is an object of my invention to provide a new and improved clutching device for use in transmission mechanisms. It is another object of my invention to provide a new and improved clutching device employing magnetic means for urging the parts to the clutching position.

Further objects and advantages of my invention will become apparent as the following description proceeds and the features of novelty which characterize my invention will be pointed out with particularity in the claims annexed to and forming a part of this specification.

Figure 1:
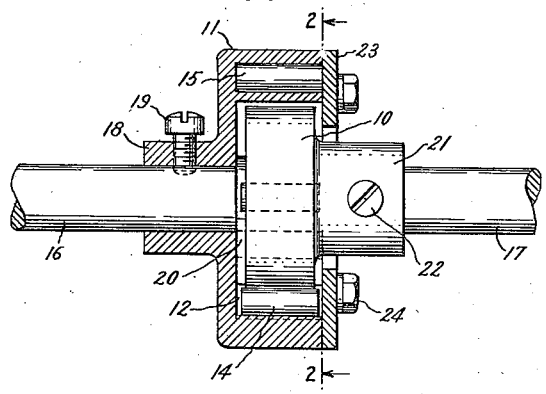
Figure 2:
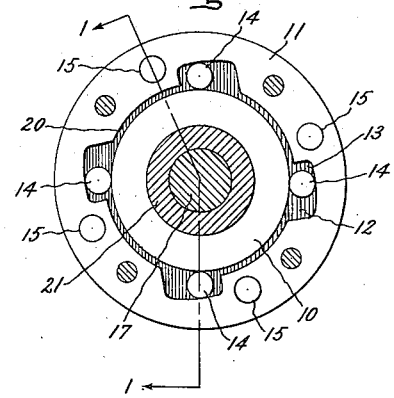

For a better understanding of my invention, reference may be had to the accompanying drawing in which Fig. 1 is a view, partly in section along the line 1—1 of Fig. 2, of a clutch embodying the principles of my invention, and Fig. 2 is a sectional view taken along the line 2—2 of Fig. 1.

In the illustrative form of my invention, I have provided a pair of clutch elements 10 and 11, preferably formed of nonmagnetic material, arranged one within the other and capable of free rotation with respect to each other. The outer element or casing 11 is provided with one or more recesses 12 in the inner face thereof, the bottom wall 13 of the recesses being arranged at an inclination with respect to the adjacent surface of the inner clutch element 10. In order to clutch the elements 10 and 11, there is provided a wedging member 14 of magnetic material in each recess. In order to urge the wedging members 14 into the clutching position, there is provided a plurality of magnet elements 15, a magnet element being disposed adjacent to the shallow end of each of the recesses 12.

Describing the illustrative form of my invention in greater detail, there is illustrated in the drawing a pair of shafts 16 and 17, one of which is a driving shaft and the other a driven shaft, depending upon the direction of rotation of the device. The clutch element 11 is secured in any convenient fashion to the shaft 16 as by means of a hub 18 and a suitable threaded member 19 for keying the hub to the shaft. The member 11 is shown in the form of an annular hollow housing, providing a recess 20 for the reception of the clutch element 10.

The clutch element 10 is shown as generally cylindrical in form and arranged to be concentrically mounted in the recess 20 with respect to the cylindrical portion of the element 11. The element 10 may be secured to the shaft 17 by means of a hub 21 integral with or suitably attached to the element 10 and a threaded fastening member 22.

Within the inner surface of the element 11, there are formed the recesses 12, the bottom walls, as has been described, being disposed at an inclination with respect to the periphery of the element 10; in other words, the bottom walls of the recesses are shaped to provide cam faces, the recesses becoming shallower in the circumferential direction.

In order to clutch the elements 10 and 11, I have provided the wedging members 14 as heretofore explained. The wedging members are preferably cylindrical rollers of magnetic material, such as steel, for example, and the axes of the rollers are disposed in parallel relationship to the axes of the shafts 16 and 17. There may be any desired number of recesses.

In order to close the recess 20 and thereby prevent the wedging members 14 from working out of the recesses 12, there may be provided an annular plate member 23 suitably secured to the element 11 as by means of a plurality of threaded fastening members 24 extending through suitable openings in the plate into threaded engagement with suitably tapped bores in the element 11.

I prefer to make the magnetic members 15 in the form of permanent bar magnets, and best results are obtained if a high coercive force material is employed.

In order to prevent short circuiting of the poles of the magnet, it is necessary to provide nonmagnetic material surrounding the magnet when the magnets are embedded in the element 11 as herein disclosed. The most satisfactory manner of accomplishing this result is to form the clutch element 11 from a nonmagnetic material, such as brass. It is also desirable to form the element 10 from nonmagnetic material. Moreover, the magnets should be as close as possible to the recesses to provide as short a flux path as possible.

From an inspection of Fig. 2, it will be seen that, if shaft 16 and, hence, housing 11 is rotated in a counterclockwise direction, shaft 17 is free of driving engagement with the driving shaft because the force of rotation tends to urge or roll the wedging members into the deep end of the recess 12. However, if the direction of rotation of the shaft 16 is reversed, the relative movement between the shafts tends to urge the wedging members or rollers toward the shallow end of the recesses 12 for wedging the elements 10 and 11 and thus driving the shaft 17. Similarly, driving the shaft 17 will cause operative engagement or disengagement with shaft 16. Inasmuch as the magnetic flux from the magnets 15 reacts upon the wedging members 14 at all times, it will be understood that there is a constant force urging the wedging members toward the shallow end of the recesses 12 so that, whenever the driving shaft is rotated in a direction to clutch the driven shaft, the clutching action will take place immediately.

While I have shown a particular embodiment of my invention, I do not desire my invention to be limited to the particular construction shown and described, and I intend in the appended claims to cover all modifications within the spirit and scope of my invention.

What I claim as new and desire to secure by Letters Patent of the United States is:

1. In a transmission mechanism of the type having a pair of clutch elements arranged one within the other and capable of free rotation with respect to each other and the outer element having one or more recesses diminishing in depth in a circumferential direction, said elements being formed of nonmagnetic material, a wedging member of magnetic material disposed in each of said recesses, and permanent magnet means adjacent to the shallow end of each recess for urging each of said wedging members to the wedging position.

2. In a transmission mechanism of the type having a driving shaft, a driven shaft axially aligned therewith, means for operatively connecting said shafts including an enlarged annular end portion on one of said shafts disposed within a concentrically arranged annular housing spaced from said end portion, said housing having one or more peripheral recesses and the bottom walls of each of said recesses being shaped to provide a cam face, said end portion and said housing being formed of nonmagnetic material, a roller of magnetic material in each recess and having its axis parallel to the axes of said shafts for providing free rotation in one direction but wedging action between the cam face and said end portion for clutching the shafts in the opposite direction, and a permanent magnet carried by said housing adjacent each recess at the shallow end thereof for urging said rollers to the wedging position.

FREDERICK W. HOTTENROTH, Jr.